US005406083A

United States Patent [19]

Sandell et al.

[11] Patent Number: 5,406,083

[45] Date of Patent: Apr. 11, 1995

[54] MOTION DETECTOR WITH TWO-SIDED PIR SENSOR IN REFLECTIVE ARRANGEMENT

[75] Inventors: Donald R. Sandell, San Jose; Wade P. Lee, Lafayette, both of Calif.

[73] Assignee: Intelectron Products Company, Hayward, Calif.

[21] Appl. No.: 181,390

[22] Filed: Jan. 12, 1994

[51] Int. Cl.[6] ..... G01J 5/08

[52] U.S. Cl. ..... 250/353; 250/342; 250/DIG. 1

[58] Field of Search ..... 250/342, 353, DIG. 1

[56] References Cited

U.S. PATENT DOCUMENTS

| | | | |
|---|---|---|---|
| 4,644,147 | 2/1987 | Züblin | 250/221 |
| 4,703,171 | 10/1987 | Kahl et al. | 250/203 |
| 4,778,996 | 10/1988 | Baldwin et al. | 250/353 |
| 5,103,346 | 4/1992 | Chang | 359/855 |
| 5,200,624 | 4/1993 | Pederson, Jr. et al. | 250/342 |
| 5,308,985 | 5/1994 | Lee | 250/342 |

*Primary Examiner*—Carolyn E. Fields
*Attorney, Agent, or Firm*—Elliot B. Aronson

[57] ABSTRACT

A passive infrared motion detector with a 360° field of view. The motion detector includes an integrated-circuit infrared sensor package containing an infra-red sensor having one or more sensing elements. The integrated-circuit sensor package is provided with viewing windows on both sides and the sensing elements are mounted within the integrated-circuit package so that both sides of the sensing elements are able to receive infrared radiation through the viewing windows from the areas in front of and behind the integrated-circuit package. The motion detector includes infrared-reflecting means that are disposed with respect to the front and rear surfaces of the sensing elements so as to reflect radiation to the surfaces from lateral areas on both sides of the integrated-circuit package. The infrared reflecting means are positioned to leave at least a portion of the surfaces on both sides of the sensing elements unobstructed for receiving infrared radiation directed at the respective unobstructed portions from the frontal and rear regions of the field of view. A focusing means is provided to direct infra-red radiation from a plurality of zones in the frontal and rear regions of the field of view directly to the unobstructed portions of the sensing elements and from a plurality of zones in both lateral regions of the field of view to the reflecting means for reflection to the sensing elements.

17 Claims, 5 Drawing Sheets

MOTION DETECTOR WITH TWO-SIDED PIR SENSOR IN REFLECTIVE ARRANGEMENT

BACKGROUND OF THE INVENTION

The present invention relates to passive infra-red motion detection devices and is particularly directed to optical arrangements for achieving a wide field of view.

Infrared motion detection devices are commonly used in automatic light switches and security systems to rum on a light or to activate some other form of alarm or warning indicator when a person or motor vehicle enters a monitored area. Such devices may be used in residential lighting, for example, to illuminate a walkway as a person approaches the front door or to illuminate a driveway as a car approaches. They are also popular as energy saving devices in large office buildings or industrial plants, which may have hundreds of rooms to be illuminated day and night. The motion detection devices can save considerable energy and cost by automatically extinguishing the lights in unoccupied rooms.

The devices function by sensing heat, in the form of infra-red radiation, emanating from a person or similarly warm object as the person or object enters or moves about in the field of view of the device. An arrangement of mirrors and/or lenses directs the incident infra-red radiation to a sensor assembly that may include one or more sensors. When the sensor assembly detects an appropriate heat impulse, the device provides an electrical signal to activate the light or other alarm. A common configuration includes an array of individual lenslets, in which each lenslet focuses infra-red radiation from a particular spatial zone of limited extent to one or more sensors. The field of view of the motion detector is the region of space spanned by the totality of these zones. It is by means of these zones that the motion detector is able to detect motion. In a simple embodiment the motion detector turns on a light or provides other indication whenever a person or other warm object enters a single zone. In more complex embodiments the motion detector can be configured to turn on the light only when the warm object sequentially enters and exits a specified number of zones. In this way the motion detector detects movement within its field of view by detecting the heat from the moving object as it enters and exits one or more individual zones in the field of view. The light is typically turned off automatically if no movement is detected within a specified time interval.

Motion detectors for monitoring a full 360° field of view present their own characteristic problems. The passive infrared (PIR) sensor found in popular integrated-circuit (IC) packages does not lend itself well to achieving wide fields of view. These integrated-circuit sensor packages typically include one or more planar sensing elements which are irradiated through a window on the surface of the IC package. These IC sensor packages are most sensitive to head-on radiation, incident at 90° to the window surface. Their sensitivity drops off the more the incident radiation approaches the sensor from the side, i.e., the more the radiation approaches the sensor at a glancing angle. To achieve a wide field of view, known motion detectors generally require complicated optical arrangements for directing the infrared radiation from the outlying reaches of the desired field of view into the significantly narrower angular reach of the sensor sensitivity. Some motion detectors have achieved wider fields of view by compounding a plurality of integrated-circuit sensor packages, each having its own limited field of view, with optical arrangements that bring the incident radiation to the proper sensor at the proper angle to be perceived. In any event motion detectors with wide fields of view have generally involved a tradeoff among increases in cost, complexity, and the physical size of the motion detector unit, and a compromise in performance. For motion detectors approaching a full 360° field of view the tradeoff is all the more stringent.

SUMMARY OF THE INVENTION

The present invention provides a passive infrared motion detector with a 360° field of view significantly overcoming the above tradeoff. The invention achieves this result by employing optical arrangements taking advantage of an integrated-circuit sensor package having two windows on opposite sides for viewing the sensing elements in the package from either side.

Briefly, a passive infrared motion detector according to the invention includes an integrated-circuit infrared sensor package containing an infra-red sensor having one or more sensing elements. The integrated-circuit sensor package is provided with viewing windows on both sides and the sensing elements are mounted within the integrated circuit package so that both sides of the sensing elements are able to receive infrared radiation through the viewing windows from the areas in front of and behind the integrated-circuit package. The motion detector includes infrared-reflecting means that are disposed with respect to the front and rear surfaces of the sensing elements so as to reflect radiation to the surfaces from lateral areas on both sides of the integrated-circuit package. The infrared reflecting means are positioned to leave at least a portion of the surfaces on both sides of the sensing elements unobstructed for receiving infrared radiation directed at the respective unobstructed portions from the frontal and rear regions of the field of view. A focusing means is provided to direct infra-red radiation from a plurality of zones in the frontal and rear regions of the field of view directly to the unobstructed portions of the sensing elements and from a plurality of zones in both lateral regions of the field of view to the reflecting means for reflection to the sensing elements.

The invention may be configured with various arrangements of side-looking, and to some extent backward-looking, reflection faces providing 360° coverage as well as upward-looking reflection faces for providing a domed field of view, some embodiments of which are described and illustrated in detail herein. In a particularly economical arrangement the reflecting faces are limited in their size and are configured to lie close to the windows in the integrated-circuit package so as to provide an economical and compact motion detector with a field of view up to 360°.

Other aspects, advantages, and novel features of the invention are described below or will be readily apparent to those skilled in the art from the following specifications and drawings of illustrative embodiments.

DETAILED DESCRIPTION OF ILLUSTRATIVE EMBODIMENTS

Figure 1:
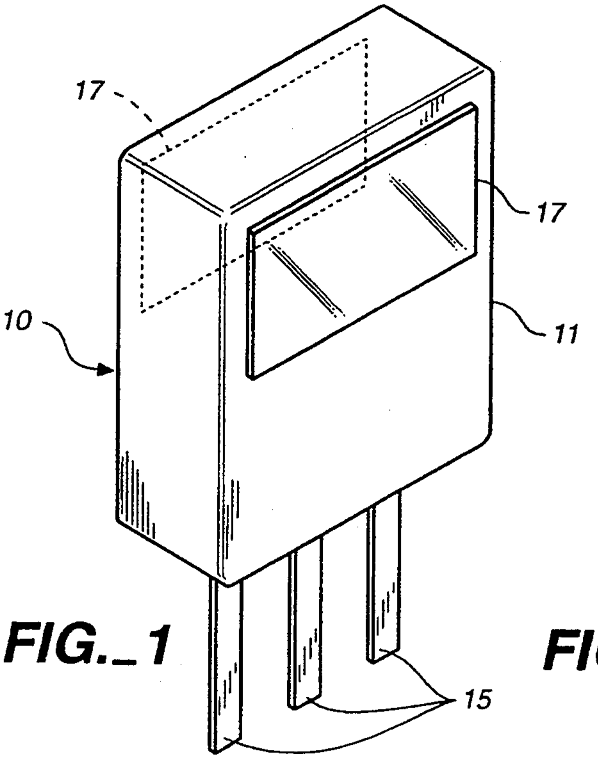
FIG. 1 is a perspective view of an integrated-circuit infrared sensor package for use with the invention.
Figure 1A:
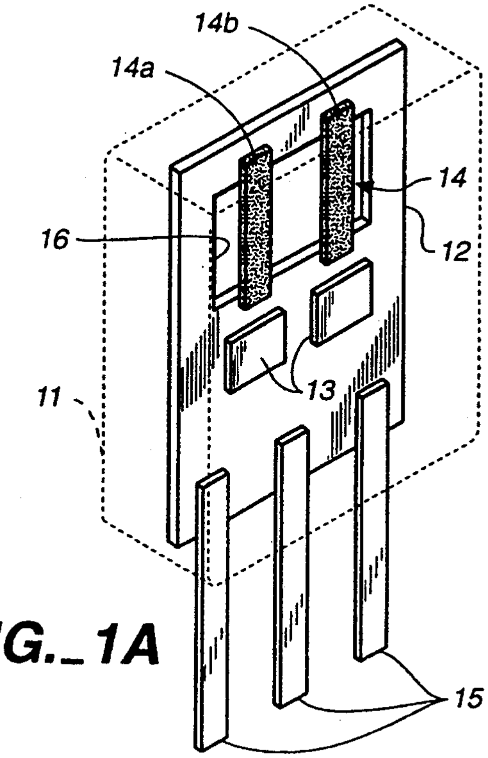
FIG. 1A is a perspective view showing the interior construction of the integrated-circuit sensor package of FIG. 1.

FIGS. 1 and 1A show an embodiment of an integrated-circuit infrared sensor package used in the invention to achieve a full 360° field of view. The package, indicated generally at reference numeral 10, includes a casing 11 having a shape known generally as a "flat pack." Within casing 11 is a substrate 12 on which the integrated-circuit control electronics, indicated generally at 13, is formed. Substrate 12 also carries an infrared sensor 14. The sensor illustrated in FIGS. 1 and 1A consists of a pair of sensing elements **14*a* and 14*b* responsive to incident infrared radiation, but appropriate integrated-circuit packages may be formed with only one or with more than two sensing elements. Leads 15** protrude from the casing for connecting the package in an electronic circuit on a printed circuit board. The construction of a flat pack integrated-circuit infrared sensor package having sensing elements as described thus far is conventional. A two-sensing-element package meeting the description thus far has been commercially marketed, for example, by Amperex Electronic Corporation of Smithfield, R.I., a North American Philips Company, as the Model No. KRX-10 and KRX-11 series.

The integrated-circuit package of FIGS. 1 and 1A goes beyond the conventional sensor packages such as the Amperex KRX-10 or -11 in that here substrate 12 is formed with an aperture 16 and the sensing elements **14*a* and 14*b* are suspended across the aperture. Sensing elements for the common integrated-circuit sensors are formed of a material that generates an electrical response when it receives infrared radiation. The electrical response is generated when the incident radiation impinges upon the sensing element from either side. Suspending the sensing elements across aperture 16 permits them to receive radiation from the area in front of and behind the integrated-circuit package. Casing 11 is formed with windows 17** on opposite walls of the IC package to expose the front and rear surfaces of the sensing elements to incident infrared radiation. The opposite walls are generally referred to herein as the front and rear walls and reference will be made herein to the area in front of and behind the package, meaning the area by the front or rear walls, respectively. Since the illustrated embodiment is approximately symmetrical with respect to front and rear, the terms "front" and "rear" are used merely as labels for ease of reference only and no structural distinction is necessarily implied thereby. Thus, the "front" and "rear" surfaces may actually face "side to side" with respect to the motion detector housing in which the IC package is enclosed or with respect to the orientation with which the motion detector is installed.

Figure 2:
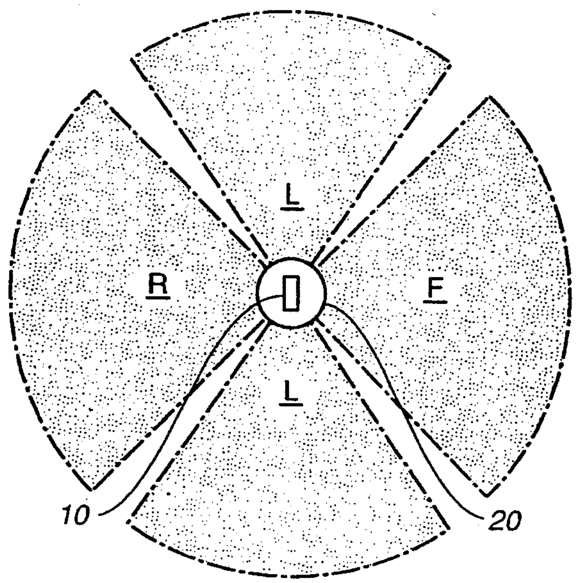
FIG. 2 is a pattern diagram showing the field of view of a motion detector according to the invention.

FIG. 2 shows a diagrammatic view of the area covered by the field of view achievable with a motion detector according to the invention employing an integrated-circuit sensor package as in FIGS. 1 and 1A. IC sensor package 10 included in motion detector 20 is positioned at the center of the field of view. The two windows 17 face forward and back. These windows define the frontal region F and rear region R of the motion detector field of view. Filling the void between the frontal and rear regions F and R are the lateral regions L lying on both sides of the IC package. Within each region will be zones of sensitivity alternating with dead zones in the manner well known from conventional PIR motion detectors with smaller fields of view. FIG. 2 is not intended to depict the details of the zones of sensitivity, but is only presented to delineate the motion detector's general area of coverage and the labeling of the various regions.

Figure 3:
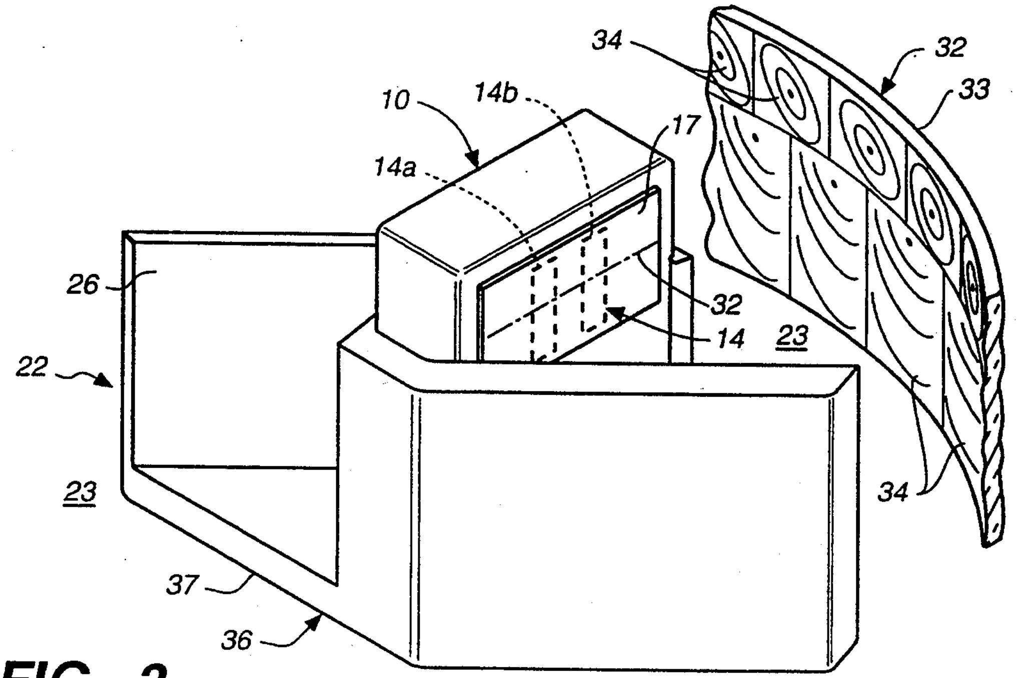
FIG. 3 is a perspective view of a first embodiment of the invention.
Figure 3A:
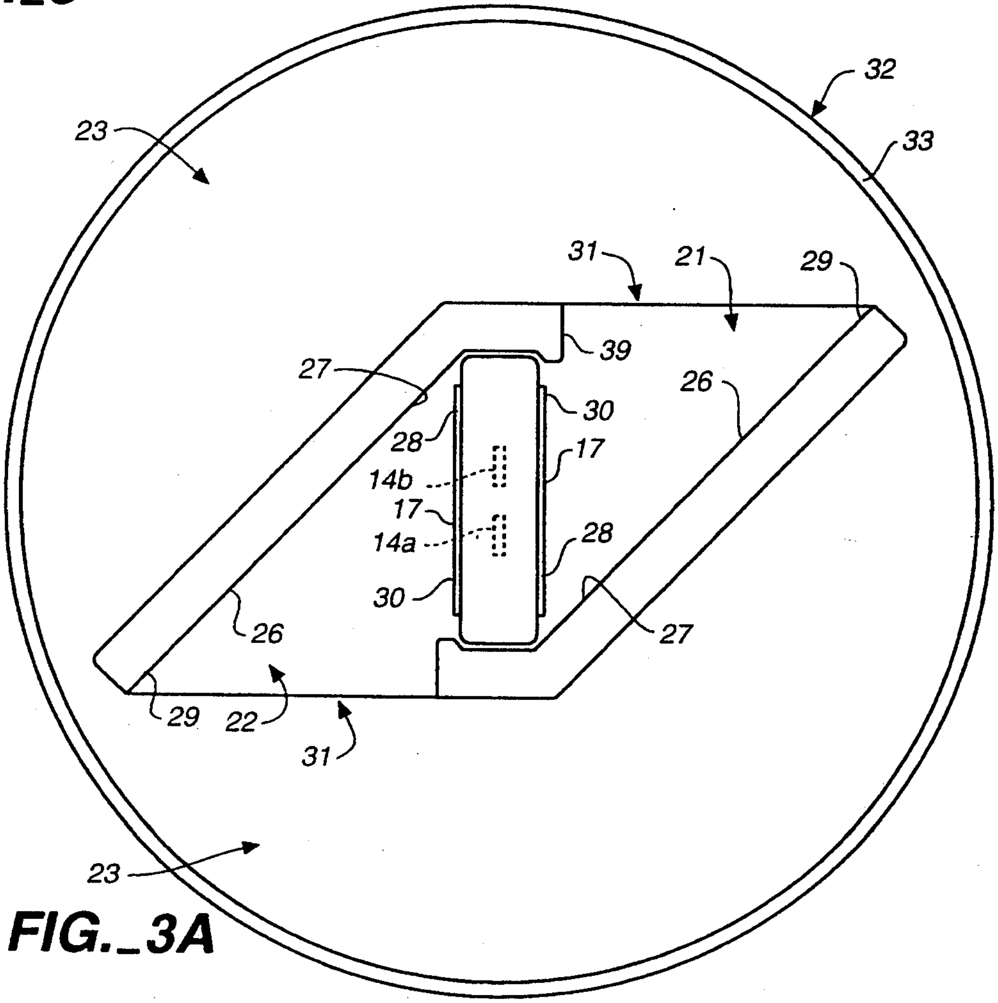
FIG. 3A is a plan view of the embodiment of FIG. 3.

FIGS. 3 and 3A show an embodiment of a motion detector achieving the field of view pattern of FIG. 2. For clarity of exposition the motion detector's external housing is omitted from the figures so that selected components of the motion detector needed for the exposition below will be plainly visible. Like reference numerals are used to identify the IC package and its components in the various motion detector embodiments illustrated in the figures.

Turning now to FIGS. 3 and 3A, IC sensor package 10 is mounted so that it is free to receive infrared radiation from the area in front of and behind the IC package where the windows 17 face. The motion detector includes two infrared-reflecting means, which are indicated generally at 21 and 22. These are inclined and disposed with respect to the front and rear surfaces of sensing elements **14*a* and *b* to reflect radiation from the lateral areas on the left and right sides of the IC package, indicated generally at reference numeral 23, to the sensing element surfaces. In the embodiment of FIGS. 3 and 3A infrared-reflecting means 21 and 22 are each formed of a planar reflecting face 26 laterally slanted with respect to the plane of the windows 17 so that each face 26 reflects radiation from a lateral area 23 to the sensing elements. More specifically, the faces 26 are each disposed with a proximal end 27 in the vicinity of one edge 28 of the facing window 17 and a distal end 29 spaced apart from a second edge 30 of the window. Distal end 29 and its associated spaced-apart edge 30 define a lateral opening 31 for receiving infrared radiation from lateral area 23 on one side of the IC package, which reflecting face 26 then reflects directly to the facing sensor surface. Although FIG. 3A shows distal end 29 directly opposite edge 30 of window 17, this positioning is not necessary. Sufficient coverage of the lateral radiation may also be achieved with configurations in which the distal end of reflecting face 26 does not reach edge 30 of the window or extends beyond edge 30. The proximal ends 27 of the two reflecting faces 26 are positioned on opposite sides of the IC package so that the reflecting faces open to opposite lateral areas 23**.

As shown in FIG. 3 reflecting faces 26 extend to the vertical level indicated by reference line 32A across window 17. In this way the reflecting faces obstruct one-half of the sensor surface and leave one-half unobstructed so that the unobstructed half may receive radiation directly from the frontal and rear regions F and R of the field of view without being blocked by the reflecting faces. In general, the reflecting means 21 and 22 are positioned to leave at least a portion of each sensor surface unobstructed so that infrared radiation may be directed at the unobstructed portions from the frontal and rear regions of the field of view without interference from the means 21 and 22. In some embodiments, such as discussed in connection with FIGS. 6 and 6A, the sensing elements may be entirely unobstructed by the means 21 and 22.

The invention also includes a means, indicated generally at reference numeral 32, for focusing infra-red radiation from a plurality of zones in the frontal and rear regions F and R of the field of view directly toward the unobstructed portions of the sensing element surfaces and from both lateral regions L of the field of view to the infrared-reflecting means 21 and 22 for reflection to the front and rear sensing element surfaces. Focusing means 32 is provided in the embodiment of FIGS. 3 and 3A by a segmented Fresnel lens array 33 defining a plurality of individual Fresnel lenslets 34, which direct radiation from well defined spatial zones in the field of view to the sensor, either directly or via reflection by a reflecting face 26. Lens array 33 is in the form of a cylinder surrounding IC package 10 and infrared-reflecting means 21 and 22 as may be seen in FIG. 3A. The structure and operation of segmented Fresnel lenses is well known in the field of infrared motion detectors and thus need not be disclosed in any further detail here. Those skilled in the art of motion detector optics will appreciate that the benefits of the invention may be achieved with other focusing means besides the segmented Fresnel lens, although the Fresnel lens is advantageous for example because of its compactness, durability and low manufacturing cost.

The reflecting faces 26 shown in FIGS. 3 and 3A are positioned close in to the IC package 10 and have a size not much larger than the sensor surface area. Close-in configurations like this employing smaller reflecting faces are desirable because they permit lower grade, and hence less costly, reflecting faces to be used because the smoothness or flatness (or other curvature) of the reflecting surface is not so critical. The close-in configurations are desirable also because they are generally easier to assemble and align.

The individual focusing elements of the focusing means 32 (i.e., the Fresnel lenslets 34) focus infra-red radiation from their associated spatial zones of sensitivity to sensor 14. When a reflecting face is placed at an angle in the path of an infrared beam from a lenslet, the beam illuminates an elliptical region on the reflecting face as it is reflected to the sensor. Because of the close proximity of face 26 to sensor 14, the illuminated ellipse in the present invention may be quite small. The surface of reflecting faces 26 should present a large enough planar area to reflect such an illumination ellipse but need not be any larger. Those skilled in the art of infrared motion detector optics will readily be able to determine the minimum necessary size of a reflecting face empirically given a specific configuration of sensor size, reflecting face angle, reflecting face position, and focal length of the focusing means. In general, however, the active area of the reflecting face need be no larger than the size of the characteristic active area of the largest individual focusing element of focusing means 32 and may typically be configured with smaller area. By active area of a focusing element is meant that area of the element that participates in producing a significant focusing of incident radiation in the normal course of operation in the motion detector. In the embodiment of FIGS. 3 and 3A that is the size of the active area of the largest Fresnel lenslet 34. Another advantage of the close-in configuration is that the optical path of a ray of infrared radiation from a focusing element (i.e., a lenslet 34) directly to a window 17 is roughly the same, within tolerable limits, as the optical path to the window via reflecting means 21 or 22. Because of this the focusing elements can be formed with the same focal length regardless of whether they focus the radiation on the sensing elements directly or via a reflection, making for simpler and less expensive fabrication.

When the invention is configured with small reflecting faces, the reflecting faces and their mounting may be formed of a single unitary member indicated generally at 36 in FIGS. 3, 4, 5 and 6. The upper portion of member 36 defines the infrared-reflecting means 21 and 22, and the base portion 37 of member 36 defines a mounting. Base portion 37 is formed with a holding portion 38 to receive and hold integrated-circuit package 10 containing the sensor. Member 36 is mounted on a mounting board (not shown) in the motion detector housing. The mounting board is typically provided by a printed circuit board although other types of mounting could also be used. Base portion 37 may be provided with mounting pegs for this purpose. Base portion 37 will have an appropriate aperture or apertures for the IC leads 15 to pass through to the mounting board.

It is important for proper operation of the motion detector that the infrared-reflecting means be aligned correctly with the underlying sensor 14. Holding portion 38 of member 36 is formed to serve an indexing function assuring proper sensor alignment. Because of the unitary structure of member 36, i.e., of reflecting faces 26 and base portion 37, the single operation of inserting the IC package into holding portion 38 of member 36 automatically assures proper alignment of the reflecting faces and the sensor. This simplifies the assembly process and leads to further savings in time and parts needed in mass production of the motion detectors. In the embodiment of FIGS. 3 and 3A holding means 38 is provided by recessed end members 39, which cup the edges of IC package 10. Recessed end members 39 are connected continuously with reflecting faces 26. This is desirable in the illustrated embodiment for economy of manufacture, but is not necessary. The embodiments of FIGS. 4, 5 and 6 show holding portion 38 provided by C-shaped members receiving the bottom edges of the IC package.

Figure 4:
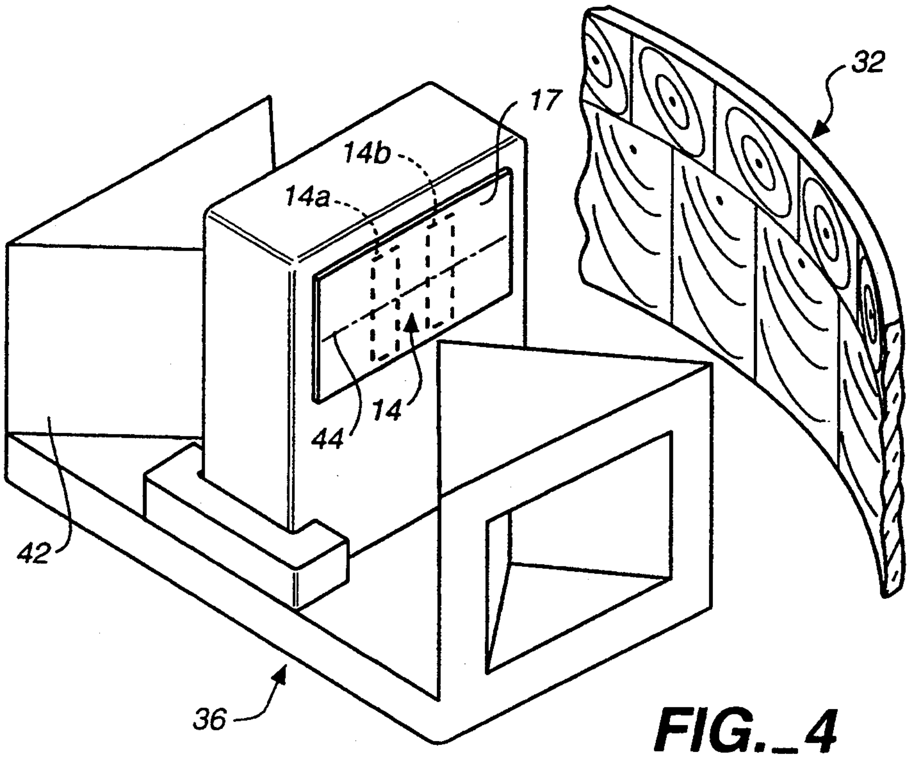
FIG. 4 is a perspective view of a second embodiment of the invention.
Figure 4A:
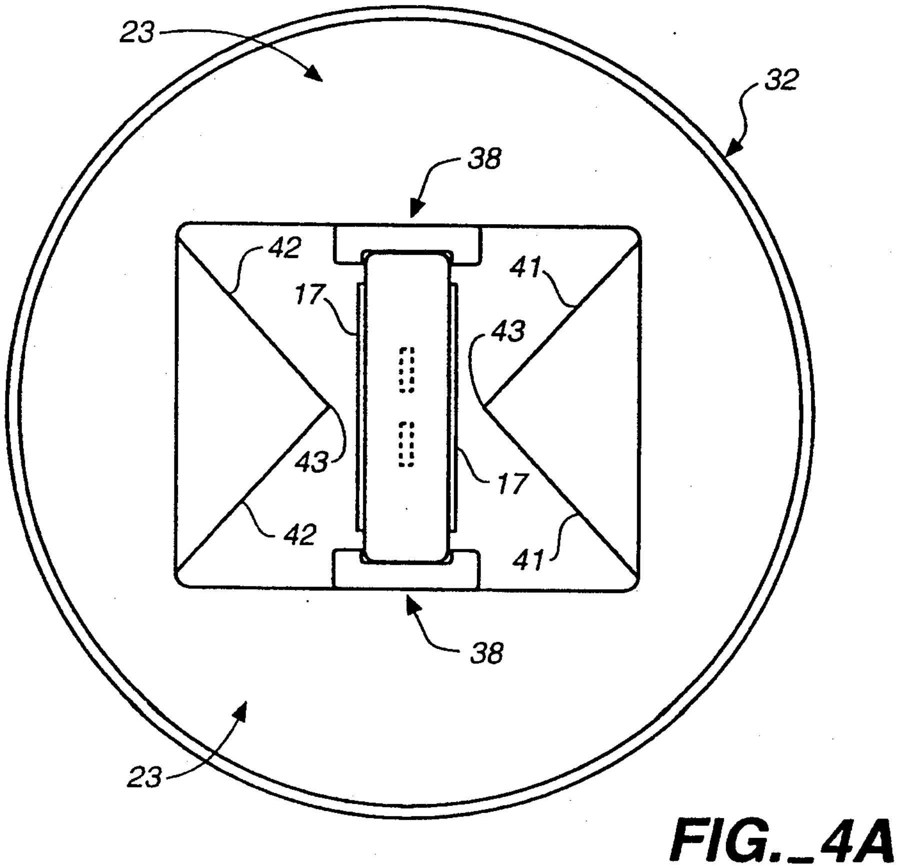
FIG. 4A is a plan view of the embodiment of FIG. 4.

FIGS. 4 and 4A show another embodiment of the invention, in which the infrared-reflecting means 21 and 22 are each provided by the combination of a front and rear reflecting face 41 and 42. Front and rear reflecting faces 41 and 42 are inclined with respect to the front and rear sensing element surfaces, respectively. An inclined front face 41 and an inclined rear face 42 together cover a lateral area 23 on one side of the IC package. In this embodiment, in contrast with the embodiment of FIGS. 3 and 3A, radiation from a single lateral area 23, that is, radiation emanating from a single lateral region L in the field of view pattern, may be reflected to the front and back surfaces of the sensing elements.

In FIGS. 4 and 4A the two front reflecting faces 41 combine to form a prismoidal shape with the apex 43 positioned to overlie the front surface of sensor 14 at a midportion of the sensor. In FIG. 4 the top of the front prismoidal shape lies at the level indicated by reference line 44, which extends across the midportion of the sensor. As in FIG. 3, radiation from the lateral areas is reflected to the lower portion of the sensor and radiation from the front or rear areas passes directly to the upper, unobstructed portion of the sensor. In general, as in the embodiment of FIG. 3, front and rear reflecting faces 41 and 42 are positioned to overlie a first portion of the respective surface to which they direct radiation and to leave a second portion of the respective surface unobstructed so that it may receive direct (i.e., unreflected) radiation from the frontal and rear regions. The embodiment of FIG. 4 may be used with a focusing means provided by a generally cylindrical segmented Fresnel lens such as shown in FIG. 3. For this reason the focusing means has been omitted from FIG. 4, although it is represented in the plan view of FIG. 4A.

Figure 5:
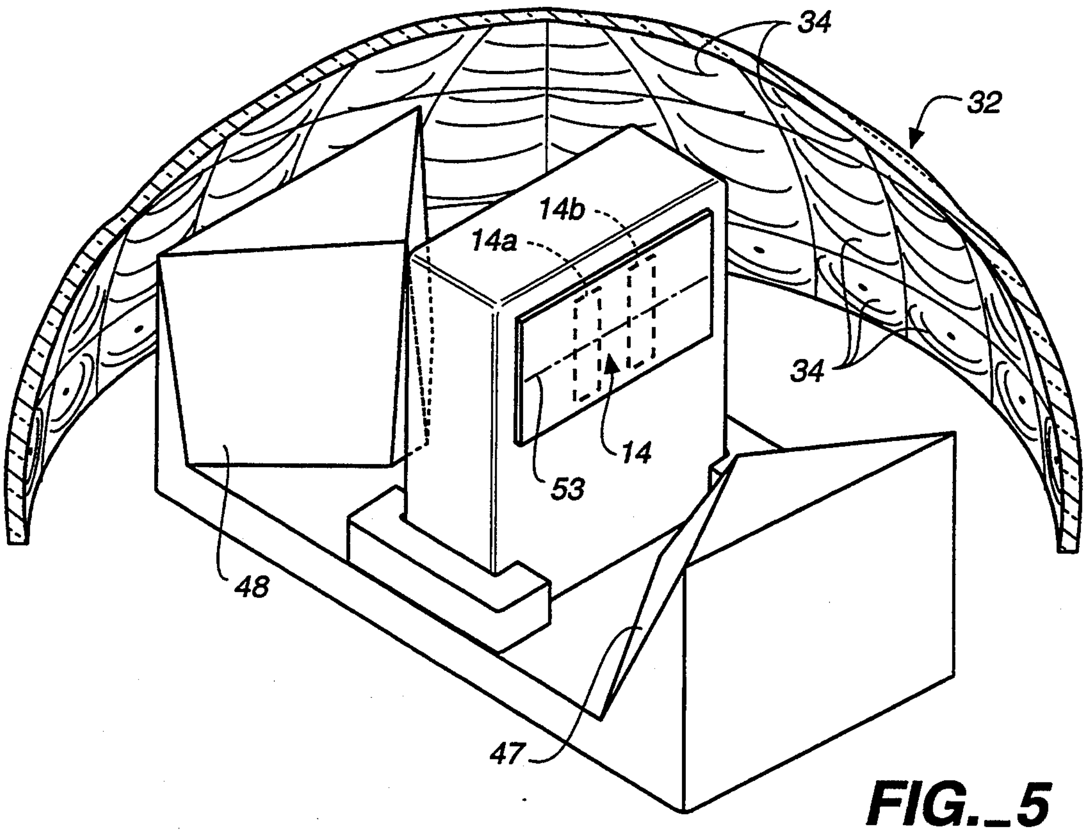
FIG. 5 is a perspective view of a modification to the embodiment of FIG. 4.
Figure 5A:
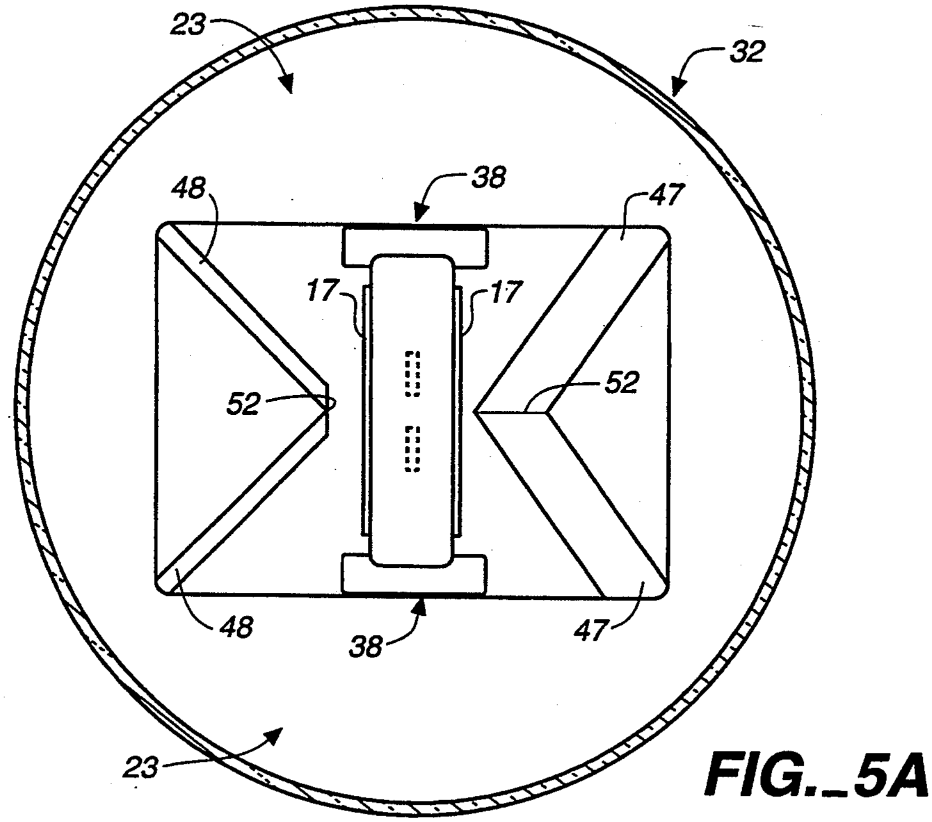
FIG. 5A is a plan view of the embodiment of FIG. 5.
Figure 6:
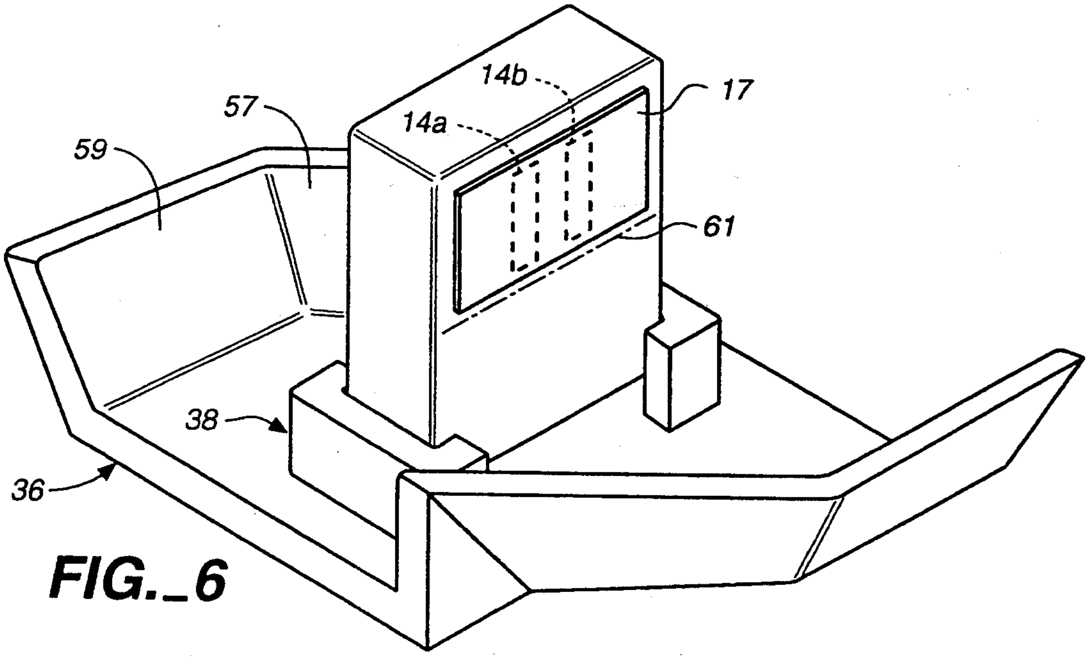
FIG. 6 is a perspective view of another embodiment of the invention.

The embodiment of FIGS. 5 and 5A is similar to that of FIG. 4, except that it provides a domed field of view not only covering radiation in the horizontal plane, but also radiation emanating from above the horizontal plane. This is accomplished by splaying out the front and rear reflecting faces 47 and 48 so that in addition to being inclined to reflect radiation to sensor 14 from a horizontal lateral direction the faces are also inclined to face upward, that is, with the upper portion farther away from the sensor than the lower portion, so that they reflect radiation from locations above the horizontal plane to the vertical sensor surface. The front and rear prismoidal faces need not be splayed back to the same degree. FIGS. 5 and 5A show two different angles for the front and rear faces 47 and 48 providing an asymmetry in the coverage above the front and rear regions. Also shown in FIG. 5 are two different shapes for the apical ends 51 and 52 where the pairs of faces 47 and 48 meet. At the front apex 51 the two faces 47 meet in a straight line. For the rear prismoidal shape the two faces 48 meet at the apical end 52 in a truncated apex forming a triangle. As in FIG. 4 the reflecting faces 47 and 48 partially obstruct sensor 14 up to reference line 53 at a midregion of the sensor. FIG. 5 illustrates a domed segmented Fresnel lens that may be used as the focusing means in this embodiment.

Figure 6A:
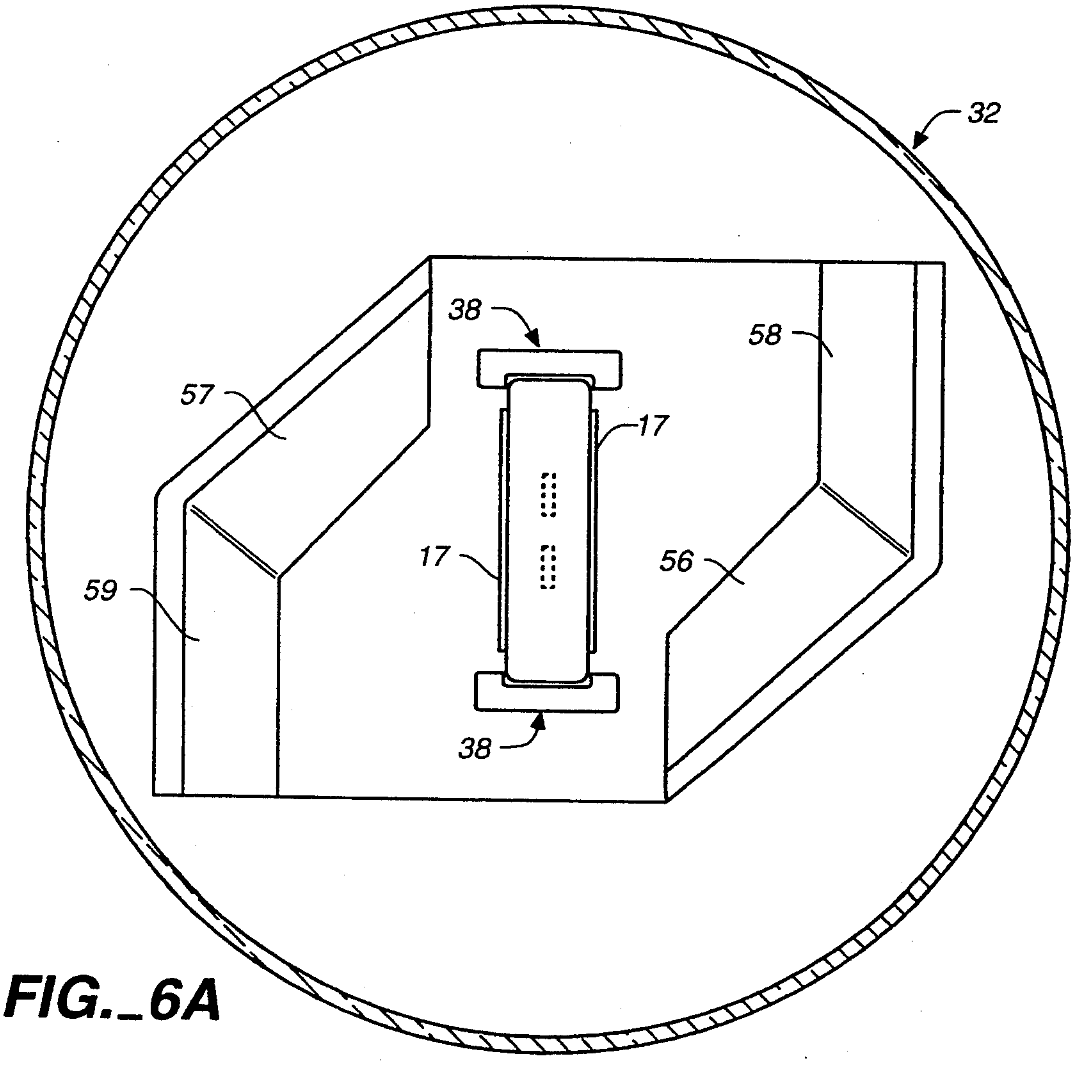
FIG. 6A is a plan view of the embodiment of FIG. 6.

The embodiment of FIGS. 6 and 6A includes first and second lateral reflecting faces 56 and 57 and additionally includes front and rear reflecting faces 58 and 59. This embodiment may be distinguished from those illustrated in FIGS. 3, 4 and 5 in that all of the reflecting faces are disposed below the level of sensor 14 and windows 17. The top edge of the reflecting faces comes to the level of reference line 61 shown on window 17 in FIG. 6. Thus, in this embodiment sensor 14 is completely unobstructed and therefore presents a greater surface area to receive direct radiation from the frontal and rear regions F and R of the field of view. Reflecting faces 56–59 are all angled to face upward so that like the embodiment of FIGS. 5 and 5A, they reflect radiation to sensor 14 from a domed region above the field of view pattern of FIG. 2. As above, lateral faces 56 and 57 are also angled with respect to the plane of windows 17 so as to reflect radiation to sensor 14 from the lateral areas 23. The embodiment of FIGS. 6 and 6A may be used with a domed focusing means of the sort shown in FIG. 5 and discussed in connection with that figure.

The embodiments shown in FIGS. 4, 5 and 6 may also be configured with the various reflecting faces positioned close in to windows 17 and sensor 14 as discussed in connection with FIGS. 3 and 3A, and these embodiments will also enjoy comparable benefits from such close-in configurations. In each of these embodiments the reflecting faces may be formed with the same size restrictions as indicated in connection with FIGS. 3 and 3A, namely, each of the reflecting faces has a reflecting area no greater than the largest characteristic focusing area of the focusing elements making up focusing means 32. For the "prismoidal" embodiments of FIGS. 4 and 5, the proximal ends of the reflecting faces, that is, the apical ends of the prismoidal shapes, may are advantageously positioned quite close to the underlying window and sensor. Sensing elements **14*a* and 14*b* may each be formed with dimensions of about 1 mm by 3 mm separated by a gap of about 1 mm. These are the nominal dimensions in conventional (one-sided) integrated-circuit sensor packages that are presently commercially available. The size of the array of sensing elements 14*a* and 14*b* may be characterized by the transverse dimension of three millimeters. As a general measure, the apical ends are spaced apart from their respective window surfaces by a distance at most equal to the characteristic transverse dimension of sensor 14**, in this case equal to the aggregate three-millimeter width of the two sensing elements and gap. Where the apical end is truncated, it may be brought in closer to the sensor.

The reflecting faces themselves may be formed of any substance capable of specular reflection in the infrared energy range, for example, aluminum, chrome-plated plastic, or gold, as may be appreciated by those with routine skill in the art of infrared reflective optics. Thus, for example, unitary mounting member 36 may be produced by a low-cost plastic fabrication method, and the reflecting faces may be plated with an appropriate reflecting layer. Alternatively, member 36 may be formed of low-cost infra-red reflecting material.

The above descriptions and drawings disclose illustrative embodiments of the invention. Given the benefit of this disclosure, those skilled in the art will appreciate that various modifications, alternate constructions, and equivalents may also be employed to achieve the advantages of the invention. For example, various other configurations of reflective faces may also be made in addition to those illustrated here. Although the illustrated reflective faces are all planar, it is also possible to include reflective faces with more than one planar facet. Furthermore, an embodiment may also be configured with focusing mirrors that serve the function of the above reflecting faces as well as the above focusing means. Therefore, the invention is not to be limited to the above description and illustrations, but is defined by the appended claims.

What is claimed is:

1. A passive infra-red motion detector having a field of view including frontal and rear regions in front of and behind the motion detector and lateral regions on both sides of the motion detector, said frontal, rear and lateral regions defining a field of view forming substantially a full circle, comprising:

an integrated-circuit infrared sensor package containing an infra-red sensor comprising at least one sensing element having front and rear surfaces responsive to incident infrared radiation, said at least one sensing element being mounted in said integrated circuit package to receive infrared radiation at said front and rear surfaces from the area in front of and behind said integrated-circuit package, respectively;

first and second infrared-reflecting means inclined and disposed with respect to said front and rear surfaces to reflect radiation from lateral areas on both sides of said integrated-circuit package to said surfaces, wherein said first and second reflecting means are positioned to leave at least a portion of each said surface unobstructed for receiving infrared radiation directed at said respective unobstructed portions from the frontal and rear regions of the field of view; and focusing means structured and arranged to direct infra-red radiation from a plurality of zones in the frontal and rear regions of said field of view directly to said unobstructed portions of said surfaces and from both lateral regions of said field of view to said first and second reflecting means for reflection to said front and rear surfaces, whereby the motion detector is provided with a field of view encompassing up to 360°.

2. The motion detector of claim 1 wherein said first and second infrared-reflecting means comprise first and second reflecting faces, said at least one sensing element defines a plane, and each said reflecting face is laterally angled with respect to said plane so that each said reflecting face reflects radiation from a said lateral area on one side of said integrated-circuit package to said at least one sensing element.

3. The motion detector of claim 2 wherein said integrated-circuit package has front and rear windows on opposite sides thereof before said front and rear surfaces, respectively, and each said reflecting face has a proximal portion at a first lateral edge of an associated said window and a distal portion spaced apart from a second lateral edge of said associated window, said distal portion and said spaced-apart second lateral edge defining a lateral opening for receiving infrared radiation from said lateral area on said one side of said integrated-circuit package for reflection to one of said surfaces, and said proximal portions of said first and second reflecting faces being positioned at opposite edges of said integrated-circuit package, whereby said lateral openings open to opposite sides of said integrated-circuit package.

4. The motion detector of claim 3 wherein said focusing means comprises a plurality of focusing elements defining said plurality of zones, said focusing elements having a largest characteristic focusing area, and each of said reflecting faces has a reflecting area no greater than said characteristic focusing area.

5. The motion detector of claim 4, further comprising:

a member having an upper portion defining said first and second reflecting faces and a base portion formed to receive said integrated-circuit package in fixed position for maintaining said front and rear surfaces of said at least one sensing element in fixed relation to said reflecting faces.

6. The motion detector of claim 2 wherein said first and second reflecting faces are positioned below said at least one sensing element so as not to obstruct said at least one sensing element and said first and second reflecting faces are additionally angled upward with respect to said plane so that each said reflecting face reflects radiation from said lateral area and from above said lateral area on one side of said integrated-circuit package to said at least one sensing element.

7. The motion detector of claim 6, further comprising third and fourth reflecting faces positioned before said front and rear sensing element surfaces and below said sensing element surfaces so as not to obstruct said at least one sensing element, wherein each of said third and fourth reflecting faces is angled upward with respect to said plane so as to reflect radiation from an area above said integrated-circuit package to said at least one sensing element, whereby said first, second, third and fourth reflecting faces reflect radiation from a domed region above said integrated-circuit package.

8. The motion detector of claim 7 wherein said focusing means comprises a plurality of focusing elements defining said plurality of zones, said focusing elements having a largest characteristic focusing area, and each of said first, second, third and fourth reflecting faces has a reflecting area no greater than said characteristic focusing area.

9. The motion detector of claim 8, further comprising:

a member having an upper portion defining said first, second, third and fourth reflecting faces and a base portion formed to receive said integrated-circuit package in fixed position for maintaining said front and rear surfaces of said at least one sensing element in fixed relation to said reflecting faces.

10. The motion detector of claim 1 wherein said first and second infrared-reflecting means each comprise front and rear reflecting faces inclined with respect to said front and rear surfaces, respectively, to direct radiation thereto from said lateral areas on the sides of said integrated-circuit package; and the front and rear reflecting faces of a respective infrared-reflecting means are disposed to receive radiation from the lateral area on the same side of said integrated-circuit package.

11. The motion detector of claim 10 wherein each of said front and rear reflecting faces is positioned to overlie a first portion of the respective surface to which it directs radiation and to leave a second portion of said respective surface unobstructed.

12. The motion detector of claim 11 wherein said focusing means comprises a plurality of focusing elements defining said plurality of zones, said focusing elements having a largest characteristic focusing area, and each of said reflecting faces has a reflecting area no greater than said characteristic focusing area.

13. The motion detector of claim 12 wherein the front reflecting faces from each of said first and second infrared-reflecting means form a front pair of reflecting faces having ends proximal to said front surface and overlying said front surface at a midportion thereof, the reflecting faces of said front pair extending toward opposite sides of said integrated-circuit package; and the rear reflecting faces from each of said first and second infrared-reflecting means form a rear pair of reflecting faces having ends proximal to said rear surface and overlying said rear surface at a midportion thereof, the reflecting faces of said rear pair extending to opposite sides of said integrated-circuit package.

14. The motion detector of claim 13 wherein said proximal ends are spaced apart from their respective surfaces at most a distance comparable to a characteristic transverse dimension of said sensor.

* * * * *

15. The motion detector of claim 14 wherein said front and rear pairs of reflecting faces each forms a generally prismoidal shape having an apical end positioned over said respective midportion.

16. The motion detector of claim 15, further comprising:

a member having an upper portion defining said front and rear pairs of reflecting faces and a base portion formed to receive said integrated-circuit package in fixed position for maintaining said front and rear surfaces of said at least one sensing element in fixed relation to said reflecting faces.

17. The motion detector of claim 15 wherein the reflecting faces of at least one of said pairs are additionally inclined upward with respect to said integrated-circuit package so as to reflect radiation to said sensor from above said integrated-circuit package.

* * * * *